(12) United States Patent
Ferris et al.

(10) Patent No.: US 8,606,667 B2
(45) Date of Patent: Dec. 10, 2013

(54) SYSTEMS AND METHODS FOR MANAGING A SOFTWARE SUBSCRIPTION IN A CLOUD NETWORK

(75) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 177 days.

(21) Appl. No.: 12/714,096

(22) Filed: Feb. 26, 2010

(65) Prior Publication Data
US 2011/0213686 A1 Sep. 1, 2011

(51) Int. Cl.
G07B 17/00 (2006.01)
G07F 19/00 (2006.01)
H04M 15/00 (2006.01)
G06F 9/455 (2006.01)
G06F 9/46 (2006.01)

(52) U.S. Cl.
USPC .............. 705/34; 709/226; 709/223; 705/30; 718/1; 718/100; 718/104

(58) Field of Classification Search
USPC ....................................................... 718/104
See application file for complete search history.

(56) References Cited

U.S. PATENT DOCUMENTS

| | | | |
|---|---|---|---|
| 6,463,457 B1 | 10/2002 | Armentrout et al. | |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 2001/0039497 A1 | 11/2001 | Hubbard | |
| 2002/0069276 A1 | 6/2002 | Hino et al. | |
| 2002/0084655 A1* | 7/2002 | Lof et al. | 290/44 |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0235451 A1* | 11/2004 | Whewell et al. | 455/406 |
| 2004/0268347 A1 | 12/2004 | Knauerhase et al. | |
| 2005/0131898 A1 | 6/2005 | Fatula | |
| 2005/0144060 A1 | 6/2005 | Chen et al. | |
| 2005/0182727 A1 | 8/2005 | Robert et al. | |

(Continued)

OTHER PUBLICATIONS

"rBuilder and the rPath Appliance Platform", 2007 rPath, Inc., www.rpath.com, 3 pages.

(Continued)

*Primary Examiner* — Ryan Zeender
*Assistant Examiner* — Allen Chein
(74) *Attorney, Agent, or Firm* — Lowenstein Sandler LLP

(57) ABSTRACT

Embodiments relate to systems and methods for managing a software subscription between an independent software vendor (ISV) and a cloud network provider. In embodiments, the software subscription can be a Software as a Service (SaaS) agreement whereby an amount of resources of the cloud network to be operated by end users can be specified. In embodiments, a resource tracking module associated with the cloud network can track the actual amount of resources operated by the end users in executing applications associated with the ISV. The resource tracking module can compare the actual amount to the amount specified in the SaaS, and adjust the resources of the cloud network accordingly. In embodiments, the SaaS can be updated based on the adjustment.

18 Claims, 5 Drawing Sheets

(56) References Cited

U.S. PATENT DOCUMENTS

| | | |
|---|---|---|
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1* | 4/2008 | Meijer et al. ............ 370/254 |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1* | 1/2009 | Cahn .................... 705/34 |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1* | 10/2009 | Jandhyala et al. ........... 705/80 |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris |
| 2009/0300635 A1 | 12/2009 | Ferris |
| 2009/0300641 A1* | 12/2009 | Friedman et al. ........... 718/104 |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0220622 A1* | 9/2010 | Wei ................ 370/252 |
| 2010/0299366 A1 | 11/2010 | Stienhans et al. |
| 2011/0016214 A1* | 1/2011 | Jackson ............ 709/226 |
| 2011/0131335 A1 | 6/2011 | Spaltro et al. |

OTHER PUBLICATIONS

White Paper—"rPath Versus Other Software Appliance Approaches", Mar. 2008, rPath, Inc., www.rpath.com, 9 pages.

White Paper—"Best Practices for Building Virtual Appliances", 2008 rPath, Inc., www.rpath.com, 6 pages.

DeHaan et al, "Methods and Systems for Flexible Cloud Management with Power Management Support", U.S. Appl. No. 12/473,987, filed May 28, 2009.

Ferris, "Methods and Systems for Providing a Market for User-Controlled Resources to be Provided to a Cloud Computing Environment", U.S. Appl. No. 12/390,617, filed Feb. 23, 2009.

Ferris, "Methods and Systems for Communicating with Third Party Resources in a Cloud Computing Environment", U.S. Appl. No. 12/390,598, filed Feb. 23, 2009.

Ferris, "Systems and Methods for Extending Security Platforms to Cloud-Based Networks", U.S. Appl. No. 12/391,802, filed Feb. 24, 2009.

DeHaan et al., "Methods and Systems for Flexible Cloud Management", U.S. Appl. No. 12/473,041, filed May 27, 2009.

DeHaan et al., "Systems and Methods for Power Management in Managed Network Having Hardware-Based and Virtual Reources", U.S. Appl. No. 12/475,448, filed May 29, 2009.

Ferris, "Methods and Systems for Providing a Universal Marketplace for Resources for Delivery to a Cloud Computing Environment", U.S. Appl. No. 12/475,228, filed May 29, 2009.

DeHaan, "Methods and Systems for Abstracting Cloud Management", U.S. Appl. No. 12/474,113, filed May 28, 2009.

DeHaan, "Methods and Systems for Automated Scaling of Cloud Computing Systems", U.S. Appl. No. 12/474,707, filed May 29, 2009.

DeHaan, "Methods and Systems for Securely Terminating Processes in a Cloud Computing Environment", U.S. Appl. No. 12/550,157, filed Aug. 28, 2009.

DeHaan et al., "Methods and Systems for Flexible Cloud Management Including External Clouds", U.S. Appl. No. 12/551,506, filed Aug. 31, 2009.

DeHaan, "Methods and Systems for Abstracting Cloud Management to Allow Communication Between Independently Controlled Clouds", U.S. Appl. No. 12/551,096, filed Aug. 31, 2009.

DeHaan, "Methods and Systems for Automated Migration of Cloud Processes to External Clouds", U.S. Appl. No. 12/551,459, filed Aug. 31, 2009.

Ferris et al., "Methods and Systems for Pricing Software Infrastructure for a Cloud Computing Environment", U.S. Appl. No. 12/551,517, filed Aug. 31, 2009.

Ferris et al., "Methods and Systems for Metering Software Infrastructure in a Cloud Computing Environment", U.S. Appl. No. 12/551,514, filed Aug. 31, 2009.

DeHaan et al., "Systems and Methods for Secure Distributed Storage", U.S. Appl. No. 12/610,081, filed Oct. 30, 2009.

Ferris et al., "Methods and Systems for Monitoring Cloud Computing Environments", U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris et al., "Methods and Systems for Verifying Software License Compliance in Cloud Computing Environments", U.S. Appl. No. 12/627,643, filed Nov. 30, 2009.

Ferris et al., "Systems and Methods for Service Aggregation Using Graduated Service Levels in a Cloud Network", U.S. Appl. No. 12/628,112, filed Nov. 30, 2009.

Ferris et al., "Methods and Systems for Generating a Software License Knowledge Base for Verifying Software License Compliance in Cloud Computing Environments", U.S. Appl. No. 12/628,156, filed Nov. 30, 2009.

Ferris et al., "Methods and Systems for Converting Standard Software Licenses for Use in Cloud Computing Environments", U.S. Appl. No. 12/714,099, filed Feb. 26, 2010.

Ferris et al., "Methods and Systems for Providing Deployment Architectures in Cloud Computing Environments", U.S. Appl. No. 12/714,427, filed Feb. 26, 2010.

(56) References Cited

OTHER PUBLICATIONS

Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
Ferris, et al., "Systems and Methods for Cominatorial Optimization of Multiple Resources Across a Set of Cloud-Based Networks", U.S. Appl. No. 12/953,718, filed Nov. 24, 2010.
Ferris et al., "Systems and Methods for Matching a Usage History to a New Cloud", U.S. Appl. No. 12/953,757, filed Nov. 24, 2010.
Ferris et al., "Systems and Methods for Identifying Usage Histories for Producing Optimized Cloud Utilization", U.S. Appl. No. 12/952,930, filed Nov. 23, 2010.
Ferris et al., "Systems and Methods for Identifying Service Dependencies in a Cloud Deployment", U.S. Appl. No. 12/952,857, filed Nov. 23, 2010.
Ferris et al., "Systems and Methods for Migrating Subscribed Services in a Cloud Deployment", U.S. Appl. No. 12/955,277, filed Nov. 29, 2010.
Ferris et al., "Systems and Methods for Migrating Subscribed Services from a Set of Clouds to a Second Set of Clouds", U.S. Appl. No. 12/957,281, filed Nov. 30, 2010.
Morgan, "Systems and Methods for Generating Multi-Cloud Incremental Billing Capture and Administration", U.S. Appl. No. 12/954,323, filed Nov. 24, 2010.
Morgan, "Systems and Methods for Aggrepting Marginal Subscription Offsets in a Set of Multiple Host Clouds", U.S. Appl. No. 12/954,400, filed Nov. 24, 2010.
Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.
Morgan, "Systems and Methods for Managing Subscribed Resource Limits in Cloud Network Using Variable or Instantaneous Consumption Tracking Periods", U.S. Appl. No. 12/954,352, filed Nov. 24, 2010.
Ferris et al., "Systems and Methods for Migrating Software Modules into One or More Clouds", U.S. Appl. No. 12/952,701, filed Nov. 23, 2010.
Ferris et al., "Systems and Methods for Brokering Optimized Resource Supply Costs in Host Cloud-Based Network Using Predictive Workloads", U.S. Appl. No. 12/957,274, filed Nov. 30, 2010.
Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.
Morgan, "Systems and Methods for Generating Optimized Resource Consumption Periods for Multiple Users on Combined Basis", U.S. Appl. No. 13/037,359, filed Mar. 1, 2011.
Morgan, "Systems and Methods for Metering Cloud Resource Consumption Using Multiple Hierarchical Subscription Periods", U.S. Appl. No. 13/037,360, filed Mar. 1, 2011.
Morgan, "Systems and Methods for Generating Marketplace Brokerage Exchange of Excess Subscribed Resources Using Dynamic Subscription Periods", U.S. Appl. No. 13/037,351, filed Feb. 28, 2011.
Morgan, "Systems and Methods for Detecting Resource Consumption Events Over Sliding Intervals in Cloud-Based Network", U.S. Appl. No. 13/149,235, filed May 31, 2011.
Morgan, "Systems and Methods for Triggering Workload Movement Based on Policy Stack Having Multiple Selectable Inputs", U.S. Appl. No. 13/149,418, filed May 31, 2011.
Morgan, "Systems and Methods for Cloud Deployment Engine for Selective Workload Migration or Federation Based on Workload Conditions", U.S. Appl. No. 13/117,937, filed May 27, 2011.
Morgan, "Systems and Methods for Tracking Cloud Installation Information Using Cloud-Aware Kernel of Operating System", U.S. Appl. No. 13/149,750, filed May 31, 2011.
Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System Installation in Cloud-Based Network", U.S. Appl. No. 13/149,877, filed May 31, 2011.

\* cited by examiner

SYSTEMS AND METHODS FOR MANAGING A SOFTWARE SUBSCRIPTION IN A CLOUD NETWORK

FIELD

The present teachings relate to systems and methods for managing a software subscription in a cloud network, and more particularly to platforms and techniques for tracking end user operation in a cloud network and adjusting resources in the cloud network based on the end user operation.

BACKGROUND OF RELATED ART

Independent software vendors (ISVs) can allow their software products and applications to be executed and operated by end users via one or more virtual machines in a cloud network. The usage by the end users can be mapped to a Software as a Service (SaaS), whereby the ISVs can be charged a rate that can be proportional or appropriate to the amount of end user operation. The rate can be agreed to upon execution of an agreement between the ISVs and a cloud network provider that estimates the amount of resources associated with the virtual machines that will be used by the end users during operation of the products and applications. For instance, the agreement can be a subscription contract whereby the ISVs are allocated an amount of virtual machine resources and/or usage time on a periodic basis, such as, for example, monthly or annually. For further instance, the agreement can allow for the ISVs to rent time and/or resources in the cloud network on an on-demand basis, for a fee.

Situations can arise, however, whereby the actual amount of cloud network resources used by the end users in the operation of the applications varies with the amount estimated in the original agreement. In particular, an ISV can find that a certain application is being operated more, or less, than expected. As such, the ISV can be forced to pay on-demand rates for more resources, or, conversely, the ISV can be charged the rate specified in the original agreement, but which is more than what is proportional to the actual end user operation.

Therefore, it may be desirable to provide systems and methods for managing a software subscription in a cloud network. In particular, it may be desirable to scale available cloud network resources based on an actual amount of end user operation of the cloud network resources. Further, it may be desirable to modify an associated agreement between an ISV and the cloud network based on the scaling of the resources.

DESCRIPTION OF EMBODIMENTS

Embodiments of the present teachings relate to systems and methods for managing a software subscription in a cloud network. According to aspects, embodiments relate to platforms and techniques for tracking end user operation in a cloud network and adjusting resources in the cloud network based on the end user operation. In aspects, the end user operation can be a set of users accessing, via a set of virtual machines, application or product resources provided by one or more ISVs. As understood herein, a software subscription or subscription plan can be an agreement between a software vendor and a cloud network provider, whereby the cloud network provider can provide resources, such as virtual machines, through which end users can operate products and applications of the software vendor. In aspects, the cloud network provider can charge the software vendor a fee based on the amount and the frequency that the end users use the resources, among other factors.

In aspects, a resource tracking or billing module can be independent of any one ISV or other vendor, and independent of any one cloud network. In aspects, the resource tracking module can be implemented on a cloud management system and can be configured to monitor resource usage in the cloud network, for example, the usage associated with end users operating the applications and products via one or more instantiated virtual machines. In aspects, the resource tracking module can compare the monitored resource usage to an estimated usage established in a subscription plan between an ISV and a cloud network provider. In aspects, the resource tracking module can be configured to modify or adjust resources associated with the cloud network based on the comparison, and update the subscription plan. For instance, the resource tracking module can scale up or down the number of or time allotted to the virtual machines of the cloud network.

Instead of situations where an ISV may be forced to pay, on an on-demand basis, for resources that exceed the resources specified in the subscription plan, or situations where an ISV may be charged an amount for resources that is disproportionate to the amount actually used by the end users, the subscription plan can be modified and the associated resources can be scalable such that the ISV can pay an amount appropriate to the actual usage of the resources in the cloud network. Therefore, ISVs can save money throughout the life of the subscription plan and time in the creation of the subscription plan. Further, the subscription plan modification methods and systems can make for a more streamlined process.

Figure 1:
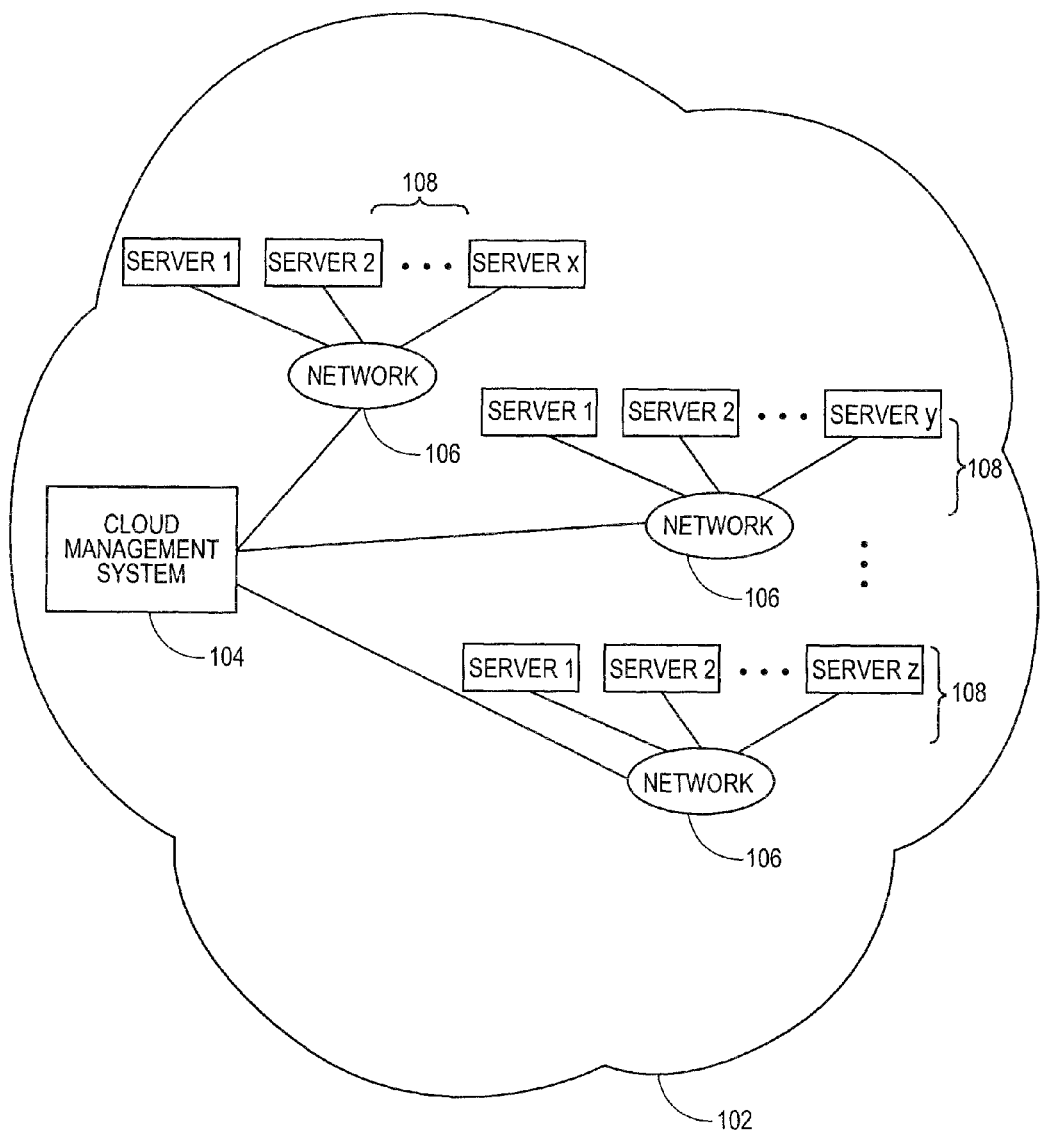
FIG. 1 illustrates an overall cloud system architecture in which various embodiments of the present teachings can be practiced.

Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via network 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more of the set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours.

The cloud management system 104 can select group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet protocol (IP) addresses or other addresses. The cloud management system 104 can register the finalized group of servers in the set of resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in the set of resource servers 108. The cloud management system 104 can receive a confirmation message back from each participating server in the set of resource servers 108 indicating a status regarding the provisioning of their respective resources. Various sets of resource servers may confirm, for example, the availability of a dedicated amount of processor cycles, amounts of electronic memory, communications bandwidth, or applications or other software prepared to be served.

Figure 2:
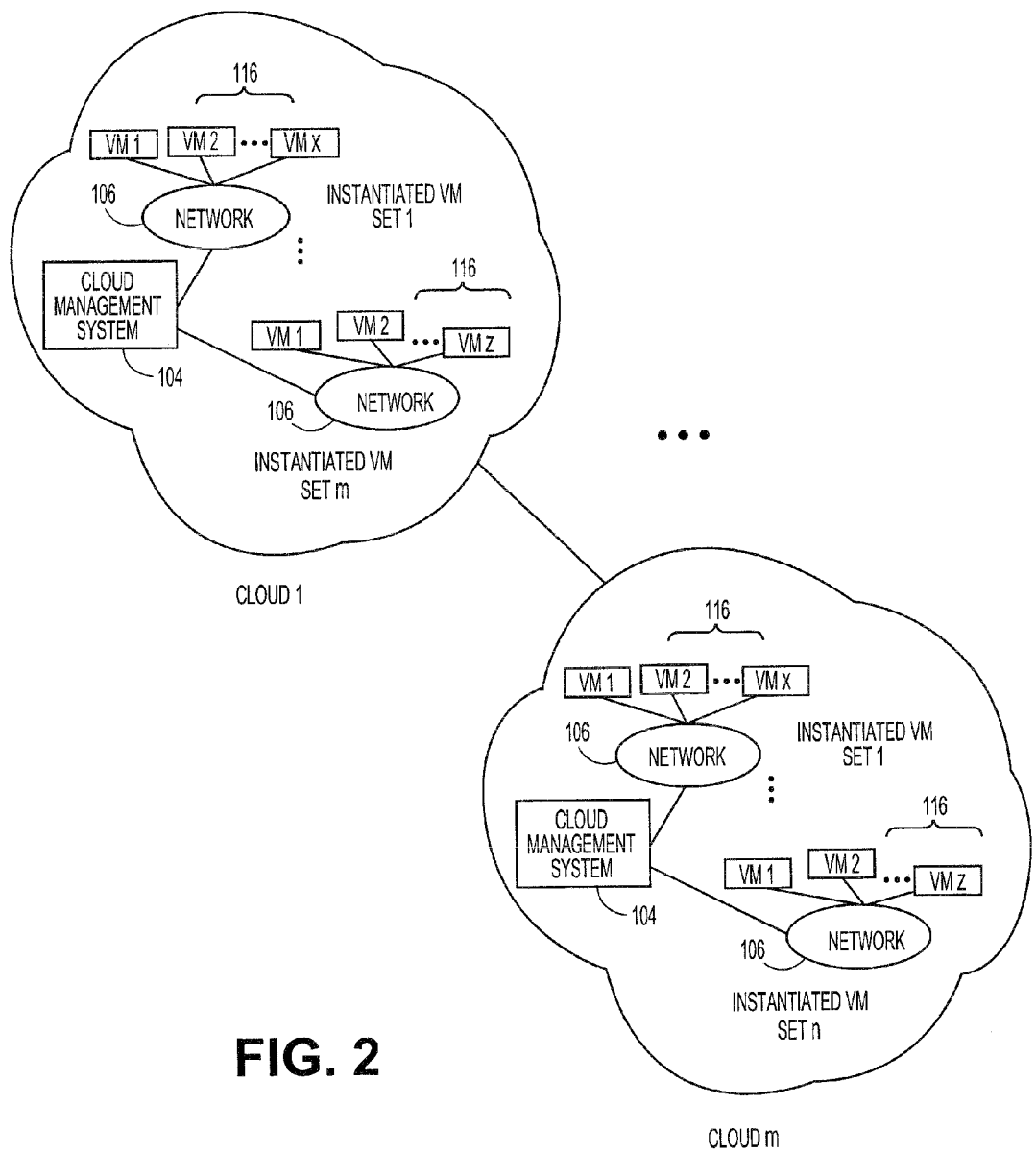
FIG. 2 illustrates an overall cloud system architecture including multiple cloud arrangements in which various embodiments of the present teachings can be practiced in another regard, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other numbers of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track, and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the network 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or delivery a software upgrade to all active virtual machines. Other management processes are possible.

In embodiments, more than one set of virtual machines can be instantiated in a given cloud at the same, overlapping, or successive times. The cloud management system 104 can, in such implementations, build, launch, and manage multiple sets of virtual machines based on the same or different underlying set of resource servers 108, with populations of different instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the main cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
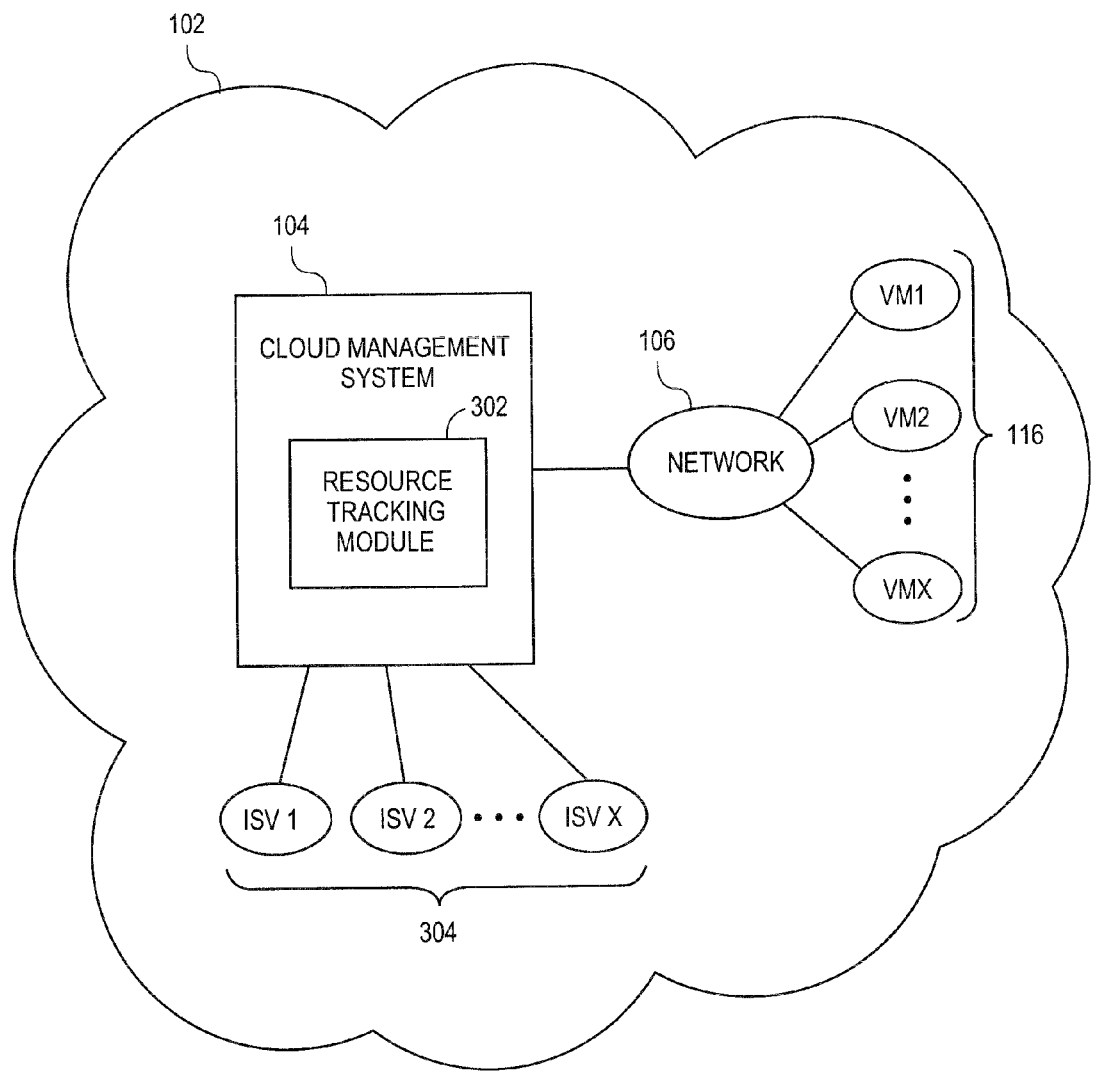
FIG. 3 illustrates an exemplary network configuration that can be used in systems and methods managing a subscription model for software providers, according to various embodiments.

FIG. 3 illustrates an exemplary network configuration that can be used in systems and methods for managing a subscription plan of a software vendor. In aspects, the subscription plan can be a SasS subscription for software vendors, such as an independent software vendor (ISV), according to embodiments of the present teachings. For instance, an ISV can enter into a subscription plan with a cloud network provider whereby the cloud network provider can provide 800 virtual machines for use by end users to operate software products associated with the ISV, wherein the cloud network provider can bill the ISV monthly for a period of 12 months.

In embodiments as shown, the cloud management system 104 can comprise a resource tracking module 302 configured to interface with the set of instantiated virtual machines 116 via the network 106 to record or track usage associated with resources in the cloud-based network 102. It should be appreciated that the resource tracking module 302 can be implemented on other hardware and/or software components configured to interface with the other components and entities described herein.

In embodiments, the set of ISVs 304 can comprise one or more vendors who download, provision, or otherwise deliver software applications, or other software, hardware, or other products or services to users accessing the cloud-based network 102. In aspects, the users can be end users of the set of instantiated virtual machines 116 located in the cloud-based network 102. In aspects, each vendor in set of ISVs 304 can deliver software product(s) and/or maintain users in one or multiple clouds, and/or across multiple products and/or product lines. In aspects, the resource tracking module 302 can track and record usage associated with the set of software applications, products, and the like by end users in the cloud-based network 102. For instance, the usage can be via the set of instantiated virtual machines 116. In aspects, the resource tracking module 302 can be configured to communicate with the set of ISVs 304, the set of instantiated virtual machines 116, and/or other machines, hosts, nodes, or resources.

The resource tracking module 302 can be configured to receive a request to use resources in the cloud 102. In particular, the request can be received from one or more of the set of ISVs 304 for use, by end users, of one or more of the set of instantiated virtual machines 116. The use of the one or more of the set of instantiated virtual machines 116 can be for the end users to operate software applications, products, services, and the like provided by the one or more of the set of ISVs 304.

In aspects, the request can specify a subscription plan between a provider of the cloud-based network 102 and the one more of the set of ISVs 304, and associated with the use of the set of instantiated virtual machines 116. For instance, the subscription plan can specify a on-demand model wherein the ISVs can be charged when the end users operate the software applications and/or products via the set of instantiated virtual machines 116. For further instance, the subscription plan can specify a time period model wherein the ISVs can be charged a flat fee per a time period of operation by the end users, such as, for example, monthly or annually.

The frequency and the amount of the end users' operation of the software applications and/or products can, however, vary for various reasons. In the present embodiments, the resource tracking module 302 can be configured to track a usage of the software applications on the set of instantiated virtual machines 116 by the end users, and compare the usage to a usage amount specified in the subscription plan. For instance, the actual usage by the end users may be more or less than the usage amount specified in the applicable subscription plan. As a result, the resource tracking module 302 can be configured to adjust resources associated with the set of instantiated virtual machines 116 based on any discrepancies.

In particular, various hardware and software resources provided by the set of resource servers 108 supporting the set of instantiated virtual machines 116 can be adjusted to accommodate an increase or decrease in end user operations such as, for example, increasing or decreasing the number of instantiated virtual machines 116 available to the end users. It should be appreciated that other various ways of adjusting the resources are envisioned.

Further, the subscription plan can specify various options to accommodate usage discrepancies. For instance, the subscription plan can specify the possibility, for example by a flat rate or other charges, to increase available resources associated with the set of instantiated virtual machines 116 and the set of resource servers 108. Similarly, the subscription plan can specify that charges assessed to an ISV can be reduced if the actual usage by the end users is less than anticipated by the subscription plan. For further instance, the subscription plan can specify that, if an ISV pays in advance, then any increase in resources can be assessed without a fee or with a reduced fee. It should be appreciated that a variety of subscription plans and associated resource adjustment methods and systems are envisioned. In further aspects, the resource tracking module 302 can be configured to update the subscription plan to coordinate with an increase or decrease in available resources.

Figure 4:
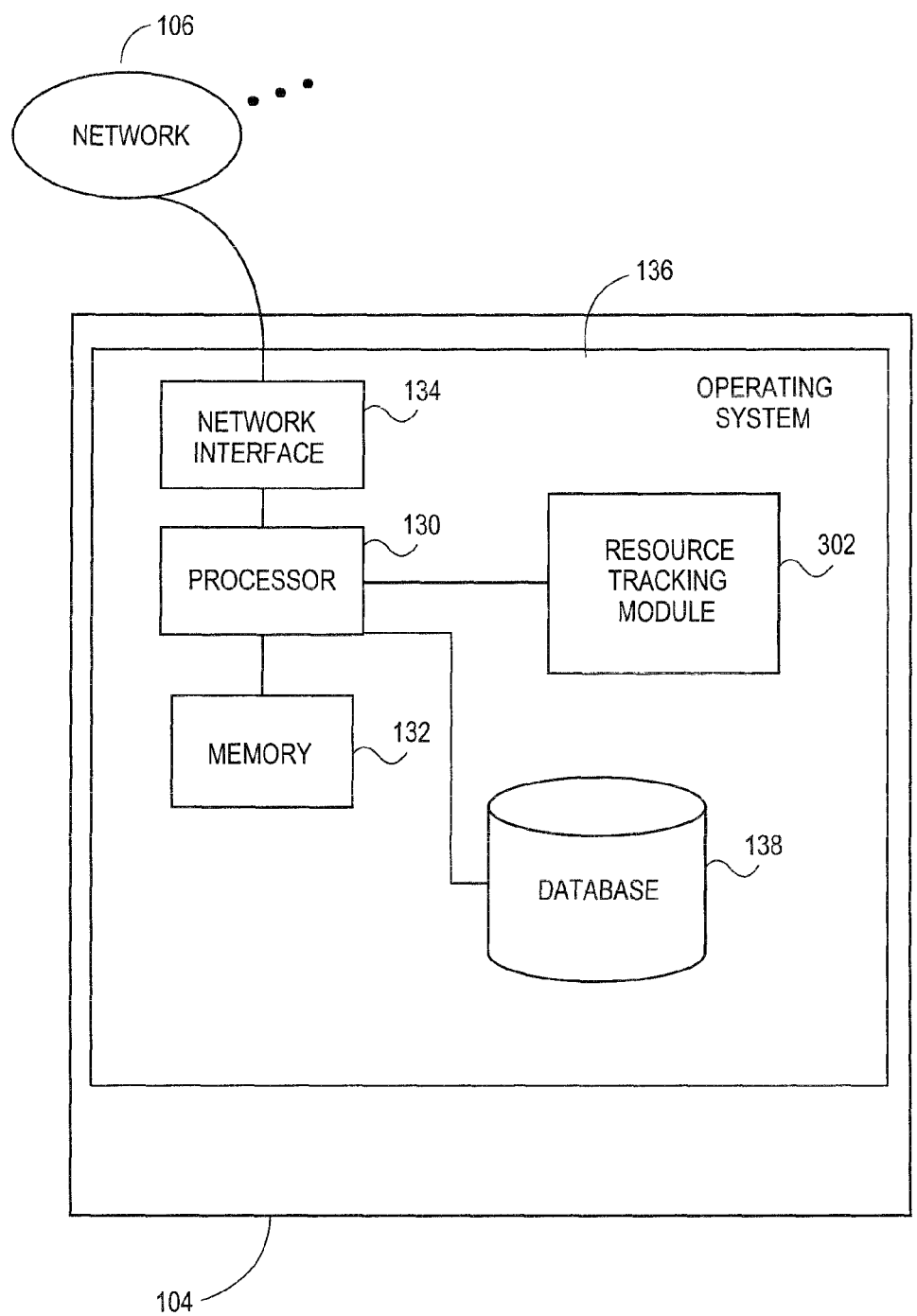
FIG. 4 illustrates an exemplary hardware configuration for a cloud management system, according to various embodiments.

FIG. 4 illustrates an exemplary diagram of hardware and other resources that can be incorporated in a cloud management system 104 configured to communicate with a set of instantiated virtual machines 116 via one or more networks 106, according to embodiments. In embodiments as shown, the cloud management system 104 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with one or more computer readable storage medium 138, such as hard drives, optical storage, databases, and the like. Processor 130 further communicates with network interface 134, such as an Ethernet or wireless data connection, which in turn communicates with one or more networks 106, such as the Internet or other public or private networks.

Processor 130 also communicates with computer readable storage medium 138 and the resource tracking module 302, to execute control logic, allow for monitoring computing processes as described herein, and control the operation of virtual machines and other resources in cloud 102. Other configurations of cloud management system 104, associated network connections, and other hardware and software resources are possible.

Figure 5:
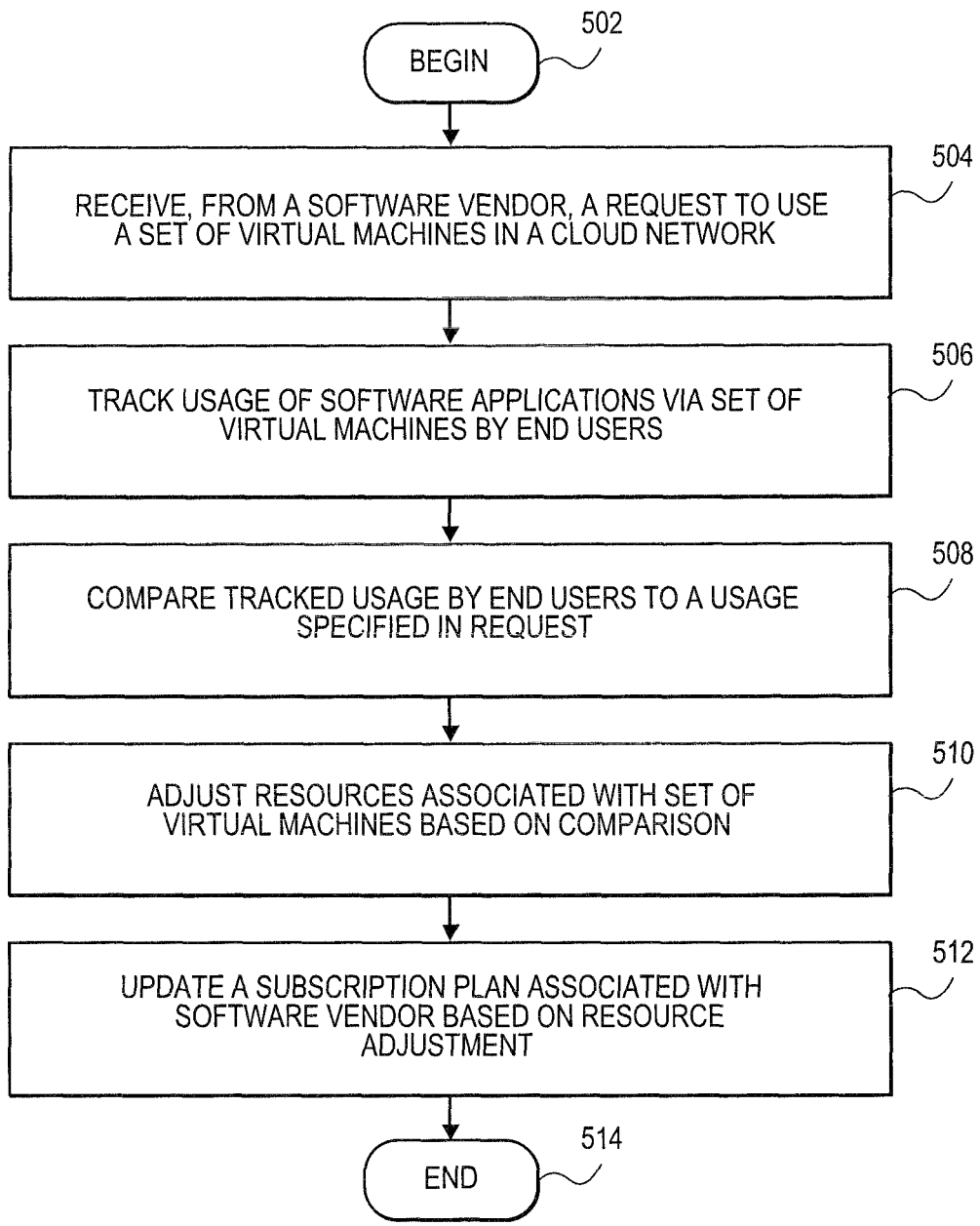
FIG. 5 illustrates a flowchart for overall subscription processing in a cloud computing environment, according to various embodiments.

FIG. 5 illustrates a flowchart for overall subscription processing in a cloud computing environment, according to various embodiments. In 502, processing can begin. In 504, a request to use a set of virtual machines in a cloud network can be received from a software vendor. In embodiments, the software vendor can be an ISV, and the use of the set of virtual machines can be for end users to operate software applications associated with the ISV via the set of virtual machines. In 506, the usage of the software applications by the end users can be tracked. In embodiments, a resource tracking module associated with a cloud management system can monitor end user operation and log an amount of time or an amount of resource usage associated with operation of the set of virtual machines.

In 508, the tracked usage of the software applications by the end users can be compared to a usage specified in the request. In embodiments, the request can specify a subscription plan that charges the software vendor a rate based on an amount of time or an amount of resource usage associated with operation of the set of virtual machines. In 510, the resources associated with the set of virtual machines can be adjusted based on results of the comparison of 508. For instance, if the actual tracked usage is more or less than an anticipated amount specified in the subscription plan, then the resource tracking module or the cloud management system can reallocate resources associated with the set of virtual machines and/or an underlying set of resource servers. In particular, the reallocation can adjust the amount of time allotted to end users to operate the set of virtual machines, adjust the quantity of resources available to the end users, and other modifications and adjustments.

In 512, the subscription plan associated with the applicable software vendor can be updated based on the resource adjustment of 510. In particular, the subscription plan can be modified so that the applicable ISV can be charged more or less depending on how much of the resources are used relative to the usage anticipated in the original subscription plan. In embodiments, the subscription plan can be adjusted automatically or manually, and at regular intervals or on demand. It should be appreciated that other ways to adjust the subscription plan and associated fees are envisioned. In 514, the processing can end.

The foregoing description is illustrative, and variations in configuration and implementation may occur to persons skilled in the art. For example, while embodiments have been described which operate using one resource tracking module 302 and associated cloud management system 104, in embodiments, one or more of resource tracking module 302 and associated cloud management system 104, and/or other servers, data stores, and/or other logic or resources can be used. For further example, while embodiments have been described in which cloud resources and subscription plans are modified or adjusted, in embodiments, the subscription plans, associated fees, and resources associated with the plans can be modified or adjusted according to any combination and at any time or interval. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
receiving, by a first cloud network of a first cloud network provider, a request to use a set of virtual machines for a registered independent software vendor (ISV) having a first subscription plan registered to a first cloud network of the first cloud network provider, wherein the set of virtual machines is configured to serve at least one application to an end user;
interfacing, by the first cloud network provider, with a second cloud network provider to coordinate execution of the set of virtual machines between the first cloud network and a second cloud network of the second cloud network provider,
wherein the ISV has a second subscription plan registered to the second cloud network;
adjusting, by a processor of the first cloud network provider, a resource allocation distribution associated with the set of virtual machines between the first cloud network and the second cloud network in view of a comparison between tracked usage of the at least one application on the set of virtual machines and a usage specified in the request; and
updating, by the processor, the first subscription plan and the second subscription plan for use of the set of virtual machines based on the adjustment to the resource allocation distribution.

2. The method of claim 1, wherein adjusting the resource allocation distribution associated with the set of virtual machines comprises increasing or decreasing an amount of available virtual machines.

3. The method of claim 1, wherein adjusting the resource allocation distribution associated with the set of virtual machines comprises increasing or decreasing an amount of time available for the end user to use the set of virtual machines.

4. The method of claim 1, wherein updating the first subscription plan and the second subscription plan comprises adjusting a fee structure charged to the ISV for the first subscription plan and for the second subscription plan.

5. The method of claim 1, wherein the usage, by the end user, of the at least one application on the set of virtual machines is tracked based on an amount of time the end user uses the set of virtual machines.

6. The method of claim 1, wherein the usage, by the end user, of the at least one application on the set of virtual machines is tracked based on an amount of resources operated when the end user uses the set of virtual machines.

7. The method of claim 1, wherein the at least one application is provided by the ISV.

8. The method of claim 1, wherein the first cloud network provider comprises a first cloud management system and wherein the second cloud network provider comprises a second cloud management system.

9. A system of a first cloud network provider, comprising:
a memory; and
a processor, coupled to the memory, the processor being configured to:
receive a request to use a set of virtual machines for a registered independent software vendor (ISV) having a first subscription plan registered to a first cloud network of the first cloud network provider,
wherein the set of virtual machines is configured to serve at least one application to an end user;
interface with a second cloud network provider to coordinate execution of the set of virtual machines between the first cloud network and a second cloud network of the second cloud network provider,
wherein the ISV has a second subscription plan registered to the second cloud network;
adjust a resource allocation distribution associated with the set of virtual machines the first cloud network and the second cloud network in view of a comparison between tracked usage of the at least one application on the set of virtual machines and a usage specified in the request; and
update the first subscription plan and the second subscription plan based on the adjustment to the resource allocation distribution.

10. The system of claim 9, wherein the resource allocation distribution is adjusted by increasing or decreasing an amount of user-level virtual machines available in the first cloud network.

11. The system of claim 9, wherein the resource allocation distribution is adjusted by increasing or decreasing an amount of time available for the end user to use the at least one user-level virtual machine.

12. The system of claim 9, wherein the first subscription plan is updated by adjusting a fee structure charged to the software vendor.

13. The system of claim 9, wherein the usage, by the end user, of the at least one application on the at least one user-level virtual machine is tracked based on an amount of time the end user uses the at least one user-level virtual machine.

14. The system of claim 9, wherein the usage, by the end user, of the at least one application on the at least one user-level virtual machine is tracked based on an amount of resources operated when the end user uses the at least one user-level virtual machine.

15. A non-transitory computer readable storage medium including instructions that, when executed by a processor of a first cloud network provider, cause the processor processing device to perform operations comprising:

receiving, by the first cloud network provider a request to use a set of virtual machines for a registered independent software vendor (ISV) having a first subscription plan registered to a first cloud network of the first cloud network provider, wherein the set of virtual machines is configured to serve at least one application to an end user;

interfacing, by the cloud management system for the first cloud network provider, with a second cloud network provider to coordinate execution of the set of virtual machines between the first cloud network and a second cloud network of the second cloud network provider, wherein the ISV has a second subscription plan registered to the second cloud network;

adjusting, by the processor, an allocation of resources, of the first cloud network and the second cloud network, associated with the set of virtual machines in view of a comparison between tracked usage of the at least one application on the set of virtual machines and a usage specified in the request; and updating, by the processor, the first subscription plan and the second subscription plan for use of the set of virtual machines based on the adjustment to the allocation of the resources.

16. The non-transitory computer readable storage medium of claim 15, wherein updating the first subscription plan and the second subscription plan comprises adjusting a fee structure charged to the ISV for the first subscription plan and for the second subscription plan.

17. The non-transitory computer readable storage medium of claim 15, wherein adjusting the allocation of the resources associated with the set of virtual machines comprises increasing or decreasing an amount of available virtual machines.

18. The non-transitory computer readable storage medium of claim 15, wherein the first cloud network provider comprises a first cloud management system and wherein the second cloud network provider comprises a second cloud management system.

* * * * *